(12) United States Patent
Holt et al.

(10) Patent No.: US 7,840,589 B1
(45) Date of Patent: Nov. 23, 2010

(54) SYSTEMS AND METHODS FOR USING LEXICALLY-RELATED QUERY ELEMENTS WITHIN A DYNAMIC OBJECT FOR SEMANTIC SEARCH REFINEMENT AND NAVIGATION

(75) Inventors: Thomas D. Holt, Atherton, CA (US); Larry S. Burke, Brentwood Bay (CA)

(73) Assignee: Surfwax, Inc., Menlo Park, CA (US)

( * ) Notice: Subject to any disclaimer, the term of this patent is extended or adjusted under 35 U.S.C. 154(b) by 802 days.

(21) Appl. No.: 11/279,327

(22) Filed: Apr. 11, 2006

Related U.S. Application Data

(60) Provisional application No. 60/678,963, filed on May 9, 2005.

(51) Int. Cl.
*G06F 7/00* (2006.01)

(52) U.S. Cl. ............................... 707/769; 707/3; 707/4; 707/102; 707/104.1

(58) Field of Classification Search ........................ None
See application file for complete search history.

(56) References Cited

U.S. PATENT DOCUMENTS

| | | | | |
|---|---|---|---|---|
| 5,084,817 | A * | 1/1992 | Kumano et al. ................ | 704/4 |
| 5,794,249 | A * | 8/1998 | Orsolini et al. .......... | 707/104.1 |
| 6,411,970 | B1 * | 6/2002 | Aitken et al. ................ | 707/205 |
| 6,639,610 | B1 | 10/2003 | Sponheim et al. ........... | 345/760 |
| 6,704,727 | B1 | 3/2004 | Kravets .......................... | 707/5 |
| 7,039,645 | B1 | 5/2006 | Neal et al. .................... | 707/101 |
| 7,213,027 | B1 * | 5/2007 | Kominek et al. ............ | 707/102 |
| 7,487,145 | B1 | 2/2009 | Gibbs et al. | |
| 2002/0100016 | A1 * | 7/2002 | Van De Vanter et al. .... | 717/112 |
| 2003/0078913 | A1 * | 4/2003 | McGreevy ..................... | 707/3 |
| 2003/0212527 | A1 * | 11/2003 | Moore et al. ................. | 702/179 |
| 2005/0283468 | A1 | 12/2005 | Kamvar et al. | |

* cited by examiner

*Primary Examiner*—Don Wong
*Assistant Examiner*—Shyue Jiunn Hwa
(74) *Attorney, Agent, or Firm*—Workman Nydegger

(57) ABSTRACT

A method and system for dynamically refining and navigating between alternative search query elements are disclosed. The method and system are applicable to searching an information system such as the Internet, an intranet, or any database, lexicon, or collection of documents, disk drive, images or video or audio content. A user enters their search query into a search query receiver. As the user enters their search query, they see, in real-time in a dynamically-generated object, such as a drop-down menu, iFrame, or browser window, possible matches to their search query string, and more specifically, the user receives within the dynamic object alternative semantically- and lexically-related search elements that relate to the search query string and from which the user can either make a selection to further refine their search query, or the user can proceed to view search results based on the selected query element. The relation of alternate lexical elements is based on a controlled or structured vocabulary (for example a thesaurus).

44 Claims, 14 Drawing Sheets

Fig. 10

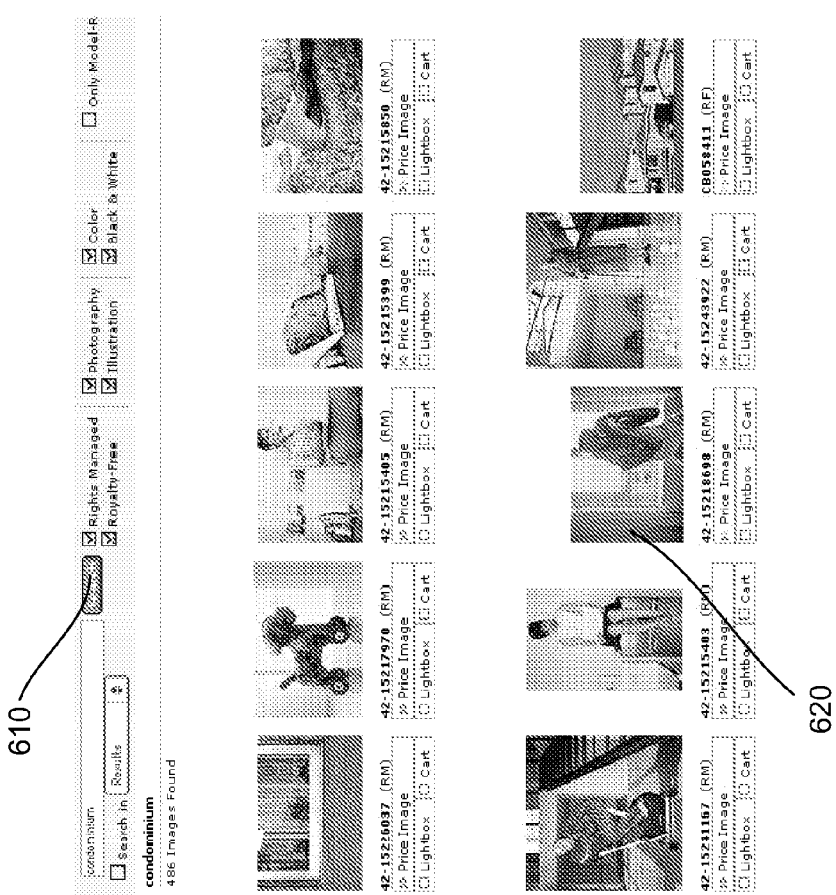

SYSTEMS AND METHODS FOR USING LEXICALLY-RELATED QUERY ELEMENTS WITHIN A DYNAMIC OBJECT FOR SEMANTIC SEARCH REFINEMENT AND NAVIGATION

CROSS REFERENCE TO RELATED APPLICATIONS

This application claims the benefit of U.S. Provisional Patent Application No. 60/678,963, entitled "System And Method For Using Lexically-Related Query Elements Within A Dynamic Object For Semantic Search Refinement And Navigation," filed on May 9, 2005, which is incorporated herein by reference in its entirety.

BACKGROUND

1. Technology Field

The present invention relates generally to computer based search and navigation. More specifically, embodiments of the present invention relate to the use of lexically-related strings, sub-strings, and/or search elements within one or more dynamically-created list objects that can be used for generating a search query or for navigation.

2. Related Technology

Information systems, including the Internet, intranets, databases, lexicons, and any collection of documents or electronic information, are growing at an explosive rate. As the size and corresponding amount of information and content of these systems grow, new search techniques and methodologies are needed to efficiently and conveniently access and navigate that information.

Currently, more efficient methods of searching usually require some form of indexing of the content stored within these systems. For example, there are established and conventional techniques for indexing information systems, such as PageRank™ used by the Google™ search engine for the Internet, or relevance or other computational linguistic methodologies for locating search results within an information system. Searching the Internet is particularly problematic. The Internet is a complex and unstructured database that is constantly growing and from which terabytes of information can be retrieved. However, traversing and navigating the Internet is becoming increasingly difficult and time consuming as its explosive growth continues, and locating relevant information on the Internet can be difficult and frustrating. Hence, for both the Internet as well as other content systems, there is a general and ongoing need to improve the quality of information that is returned in response to a user query.

Searchers are often frustrated by the sheer volume and lack of relevance of search results that result from many existing search engines and methodologies. Moreover, improved processing speeds often are not the solution. For example, the improved speed of systems such as Google's might appear to save the searcher's time, but often the exact opposite is true due to the huge volume of (often irrelevant) search results that are returned. Irrelevant and inaccurate search results is an increasing problem due in part to the ever-expanding size of the body of content being indexed; in essence immediate relevance is inversely related to breadth or size of the body of content being searched.

Existing search methodologies are lacking in other respects as well. As is known, the quality of results returned often is dictated by the quality of the search terms used in the search query. However, the articulation of an appropriate search term is often difficult. This problem typically stems from the searcher not knowing the "vocabulary" or "lexicon" of the information system/database into which they are entering their query string. What is the best or even approximate query to use? Often the user conducts the search on an iterative basis by adding to or changing their query string many times, in a "hit or miss" fashion, before arriving at the appropriate search query. The process can be time consuming and frustrating.

In a common search setting, a user might use a conventional search engine from search services available on the Internet at Google.com, Yahoo.com, OpenText.com, UltraSeek.com, Clusty.com, and the like, or a search methodology used on Internet sites such as PCConnection.com, LLBean.com, Corbis.com, Wikipedia.org. In environments such as these, a user looking for specific information typically submits a query (i.e., a Boolean logic construct of words) to the search engine/method. In response, the search tool uses the query to search for the desired information, and then returns a "hit" list containing zero or more search results that satisfy the query.

Typically, this type of search returns a large set of "hits" or results; a scenario that is increasingly common due to the growth of the Internet and related networks and databases. In addition to the large number of results that are returned, the manner in which the search results are presented to the user is often not helpful. A list of search results returned by a conventional search method is often sorted in accordance with some form of computational linguistic calculation. For example, the order of the listing may be based on a calculated relevance. In one example, relevance may be based on how many times the word(s) in the user's query are found in each result. Unfortunately, this presentation approach may not prioritize the result presentation in the most appropriate manner and, in any event, does little to address the problems presented when a large number of search results are returned. As a result, the user is required to spend more and more time sifting through the results of a search in order to find the information that is actually of interest.

In view of the foregoing problems and shortcomings, there is a need to provide a user with a better opportunity to construct an appropriate search query in the first instance. In this way, the user would be provided with a more relevant and manageable list of search results. Preferably, a solution would entail the use of semantic search tools that take advantage of the user's own knowledge of the content being searched, and that would also provide semantically- and lexically-related alternatives to the string or prompt being entered or provided by the user. The user would then be in the position of selecting the most appropriate search criteria. This type of assistance would preferably be provided dynamically or in "real time" as the user is constructing a search, thereby increasing the speed and efficiency of the search process. The use of more appropriate search criteria would result in more appropriate more relevant and more manageable search results, thereby alleviating many of the drawbacks present in currently available search systems.

SUMMARY OF INVENTION EMBODIMENTS

In view of these and other needs and drawbacks, it is one purpose of the present invention to provide a system and method for assisting a user with the identification of appropriate search criteria that can be used to search or otherwise navigate the content of a particular information system. For example, in one disclosed embodiment, the user is provided with a dynamic search environment that provides search suggestions or alternatives. Preferably, those suggestions or alternatives relate to the specific lexicon of the particular information system that is being searched. This assistance to the user allows for dynamic refinement of the user's query string for the purpose of composing and selecting a more highly-relevant search query.

In an example embodiment, a system is configured with a search query receiver (for example a search box), a query controller, a controlled-vocabulary database, a search query element viewer, and an administration module for importing, configuring, and maintaining the controlled vocabulary.

In an example system, a user, seeking to search or otherwise navigate the content of a particular information system (such as an Internet site or other LAN/WAN-based information system), enters an initial query element into the search query receiver. The search query receiver can be implemented within a client browser on a client device, such as a desktop or portable computer. The initial query element can be submitted via a keyboard text entry, a voice prompt, or any other suitable entry method. As the search query is entered, the search query receiver can (either on a word-by-word or character-by-character basis) create an "incremental" query which is passed via a network (LAN, WAN, Internet, intranet, etc.) to the query controller. The query controller interrogates the controlled-vocabulary database to find "matches" to the initial query entered thus far. From matches found in the controlled-vocabulary database, the query controller returns, via the network to the search query element viewer, semantically and lexically-related elements that relate to the user's initially entered search criteria, and to the information system/database that is being searched.

In an illustrated embodiment, the lexically-related alternative elements are presented to the user via the search query element viewer, preferably implemented as a dynamic semantic list object. In preferred embodiments, this lexically-related content is delivered into the query element viewer immediately (i.e., in substantially real-time) in response to an action by the user. While other approaches might be used, in preferred embodiments this functionality is implemented by way of a client-side object that is implemented as a dynamically-generated screen or device object such as a drop-down menu, iFrame, or browser window. The search query element viewer thus provides a real-time "view" into the specific lexicon of the information system that is being searched.

In illustrated embodiments, the dynamically created lexically-related alternative element(s) is obtained by the query controller logic from the controlled vocabulary database. The controlled vocabulary database can be administered and maintained as a database that is separate and discrete from the information system that is actually being searched/navigated.

Upon presentation of the dynamically created search query element viewer, the user can then choose to interact with the lexically-related alternative elements within the search query element viewer. For example, the user might select, add to, or change a lexically-related element that best matches their intended search or navigation requirements. In alternate embodiments, the user may iterate the above process numerous times to find the best search query. Hence, in one application a user might select one or more alternatives in the search query element viewer and from this selection perform a direct search of the information system of interest (e.g., use the selected value as a search term in a conventional search engine search). Alternatively, the user might select one of the alternatives in the search query element viewer, and load that value in the search query receiver for identification of additional possible alternatives before settling on a particular search/navigation query element. The dynamic and iterative nature of the search query element viewer greatly enhances a user's ability to identify the most appropriate query element for use in connection with a particular information system.

It will be appreciated that while example embodiments have been summarized as including a single search query receiver for a given application, the invention should not be so limited. Depending on the needs of a particular application, a search environment may include two or more search query receivers, each of which may connect or interact with one or more query controllers which are in turn interfaced with one or more controlled vocabulary databases. Each search query receiver may be associated with a search query element viewer. Alternatively, a search query receiver might be selectively associated with multiple lexicons of different controlled vocabulary databases. Depending on an option, for example selected by a user, when a user enters an initial query, the search query element viewer displays alternatives from a particular lexicon.

Another embodiment provides a method and system for the user to set display attributes such as user preferences, colors, formats, and symbols for displaying and arranging the lexical elements within the search query element viewer.

Another embodiment of the present invention provides a method and system to administer the query controlled vocabulary database. For example, an administration function can be provided that allows an administrator or user to, for example, import, change, and/or maintain the lexical elements and related attributes. This can include such parameters as global user preferences, colors, formats, symbols, and markup or programming code, which would include any kind of markup code (for example, HTML, XHTML, DHTML, WAP) and any programming code (for example, javascript, PHP, ASP, JSP) for displaying the lexically related elements/data within the search query element viewer.

One advantage of disclosed embodiments results from the ability of the system to help the user with disambiguation of query/navigation terms prior to the user performing any one of a series of selective or navigational actions. Such actions include, but are not limited to, submission of the query for the purpose of a search, selecting from pull-down menus or any other selective screen object such as screen menus, buttons, lists, navigational aide, or any process associated with interrogation of or inquiry by an information system, its content, or any of its navigation aides.

Another advantage of disclosed embodiments is the ability for the user to know immediately if a search query is within the scope and content of the information system they are searching. This provides a method for both "heads-up" lexicon content confirmation and focus. For example, conventional search methods are natural-language based, meaning that if you search for (enter a query for) "hard drive" and the information system's lexicon contains only the term "disk drive," then no search results will be returned. In contrast, illustrated embodiments will return lexical alternatives listed in the search query element viewer. Thus, in one example embodiment, as the user enters "hard dr" on a type-ahead basis en route to entering "hard drive," they might see "disk drive" listed as an alternative in the search query element viewer in addition to or instead of the term "hard drive." In disclosed embodiments, the user will be able to select any of the alternatives displayed in the search query element viewer for the purpose of initiating a search or continuing to refine the search query or navigation.

A related advantage is provided by the ability to view or learn of alternate search query strings or elements within the information system lexicon that relate to the user's original query.

Yet another advantage is realized due to the speed by which the user has to consider alternative query strings. By offering a heads-up form of "what you see is what is there," a user can more rapidly determine the query that is best for the information system lexicon with which they are engaged. For example, presently preferred embodiments might be used in connection with a commercial website, such as PCConnection.com. In that type of application environment, a user might enter "giga" into the search query receiver and then interact in the search query element viewer with lexical alternatives such as "hard drive, disk drive, gigabyte drive, Seagate 250GB," which might all be terms/phrases that are contained in the controlled-vocabulary database associated with the PCConnection.com information system lexicon of part numbers or product names.

The foregoing, together with other features and advantages of the present invention, will become more apparent when referred to the following specification, claims and accompanying drawings.

BRIEF DESCRIPTION OF THE DRAWINGS

To further clarify various aspects of exemplary embodiments of the present invention, a more particular description of the invention will be rendered by reference to specific exemplary embodiments thereof which are illustrated in the appended drawings. It is appreciated that these drawings depict only exemplary embodiments of the invention and are therefore not to be considered limiting of its scope. The drawings are not drawn to scale. The invention will be described and explained with additional specificity and detail through the use of the accompanying drawings in which:

FIG. 10 is an example screen display of use of the search query receiver and the search query element viewer with semantically- and lexically-elements matched to the depth (sub-string) indicators;

FIG. 12a illustrates one example of sample text-based search results from an information system; and FIG. 12b illustrates one example of sample image-based search results from an information system.

DETAILED DESCRIPTION OF EXAMPLE EMBODIMENTS OF THE INVENTION

Reference will now be made to the drawings to describe presently preferred embodiments of the invention. It is to be understood that the drawings are diagrammatic and schematic representations of example embodiments, and are not limiting of the present invention, nor are they necessarily drawn to scale.

In general, embodiments of the present invention relate to computer-based systems and methods for improving a user's ability to search, or otherwise navigate content within an information system, such as might be accessible via a networked environment such as the Internet. In particular, disclosed embodiments provide the ability to pre-suppose or harness lexically-related terms that already exist in the information system and that can be viewed dynamically (in substantially "real-time") by the user to help the user better articulate and select the most meaningful search or navigational query. Such techniques provide the user with a method and system for dynamically refining and navigating between alternative search query elements. Advantageously, this provides the user with better and more manageable search results and allows the user to gain access to the information that is actually being sought.

Figure 1:
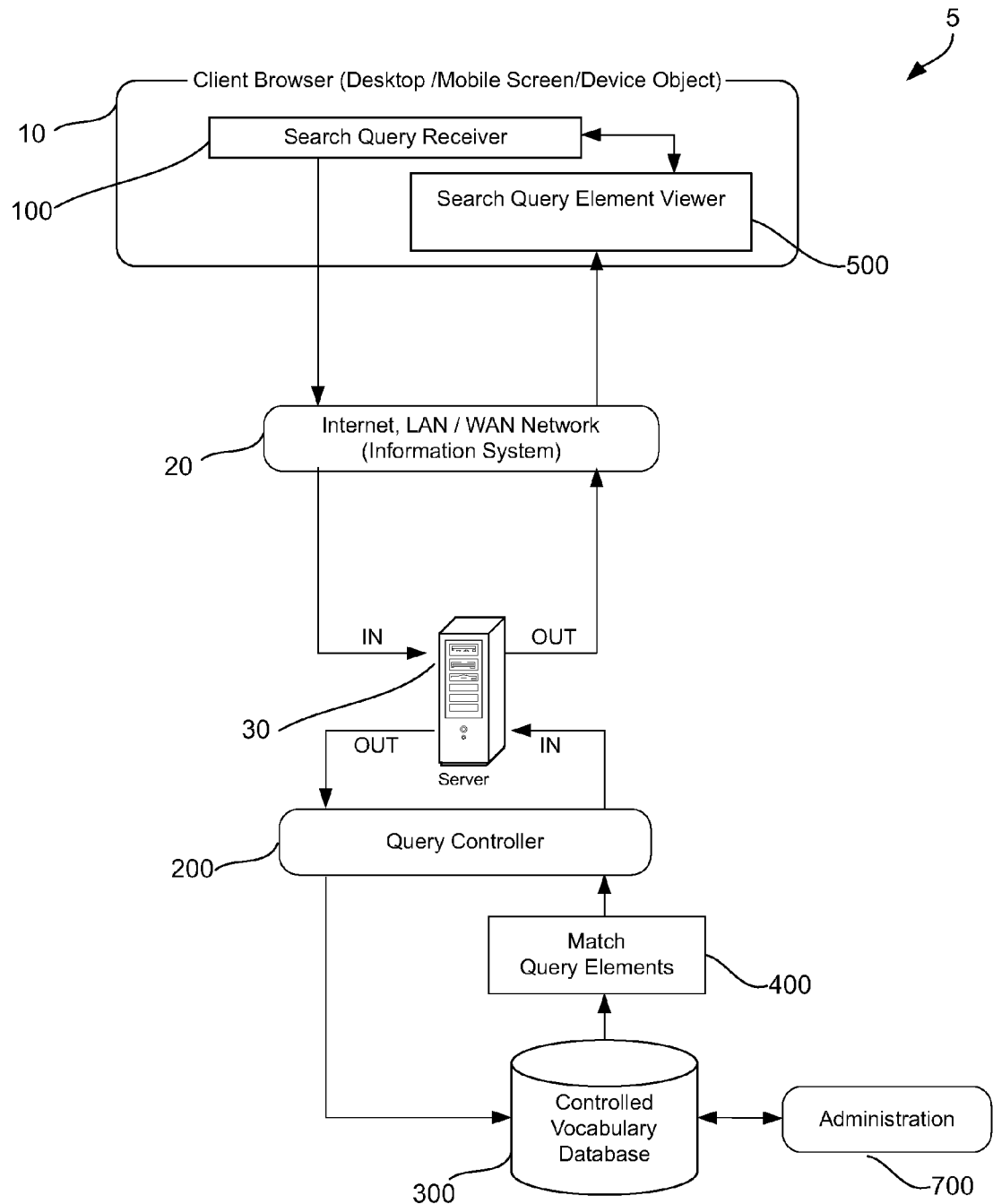
FIG. 1 is a block diagram of an overall architecture of one presently preferred embodiment of the present invention.

Reference is first made to FIG. 1, which illustrates one example of an overall system, generally designated at 5, for generating, displaying and using lexically and/or semantically-related query elements within a dynamic object for the purpose of semantic search refinement and navigation. In the illustrated embodiment, the system 5 is implemented to provide a dynamically-generated object containing lexically-related content by way of a "search and navigation palette," denoted at 10. In this way, the user can more easily and effectively refine or perform a sub-search before conducting an actual search of an information system and retrieving (potentially irrelevant) search results, such as might be accomplished by a conventional search engine such as Google™.

In the embodiment of FIG. 1 the "search and navigation palette" (also referred to as a "search palette") is denoted at 10. In example embodiments, the search palette 10 is provided by way of a user's (client) device/computer browser (or similar environment) upon the user loading or visiting an "information system" of interest, denoted at 20, such as a HTML, RSS, DHMTL or other type of page or document specific to the information system 20 being searched or otherwise navigated. As is shown, the client-side device is operatively connected with the desired information system 20 via any appropriate communication scheme, such as the Internet, an intranet or any suitable LAN/WAN-type network, including wire-based and/or wireless-based communication schemes.

Also included within the example system of FIG. 1 is a server-side computing device, such as is denoted at 30, which could be implemented as any computer-based programmable device. The server 30 is operatively connected with the client side-device by way of, for example the Internet or any other appropriate network interface. Included with the server 30 is a query controller function, denoted at 200, and a controlled-vocabulary database, denoted at 300. Optionally, preferred embodiments can include an administration module, denoted at 700, for importing, configuring, and maintaining the contents of the controlled vocabulary database 700.

As is represented in the example of FIG. 1, the "search and navigation palette" 10 includes a client-side search query receiver function 100 and a dynamically-generated search query element viewer 500. As will be described in further detail, the dynamically-generated search query element viewer 500 functions to provide an interactive "view" into the specific lexicon of the information system 20 that is being searched/navigated (for example, a website on the Internet). In particular, the viewer 500 can be used to provide a dynamic refinement of the user's query element, such as a text string, initially entered at the search query receiver 100, resulting in better composition and selection of a more relevant search query for use in connection with the information system of interest.

Figure 5:
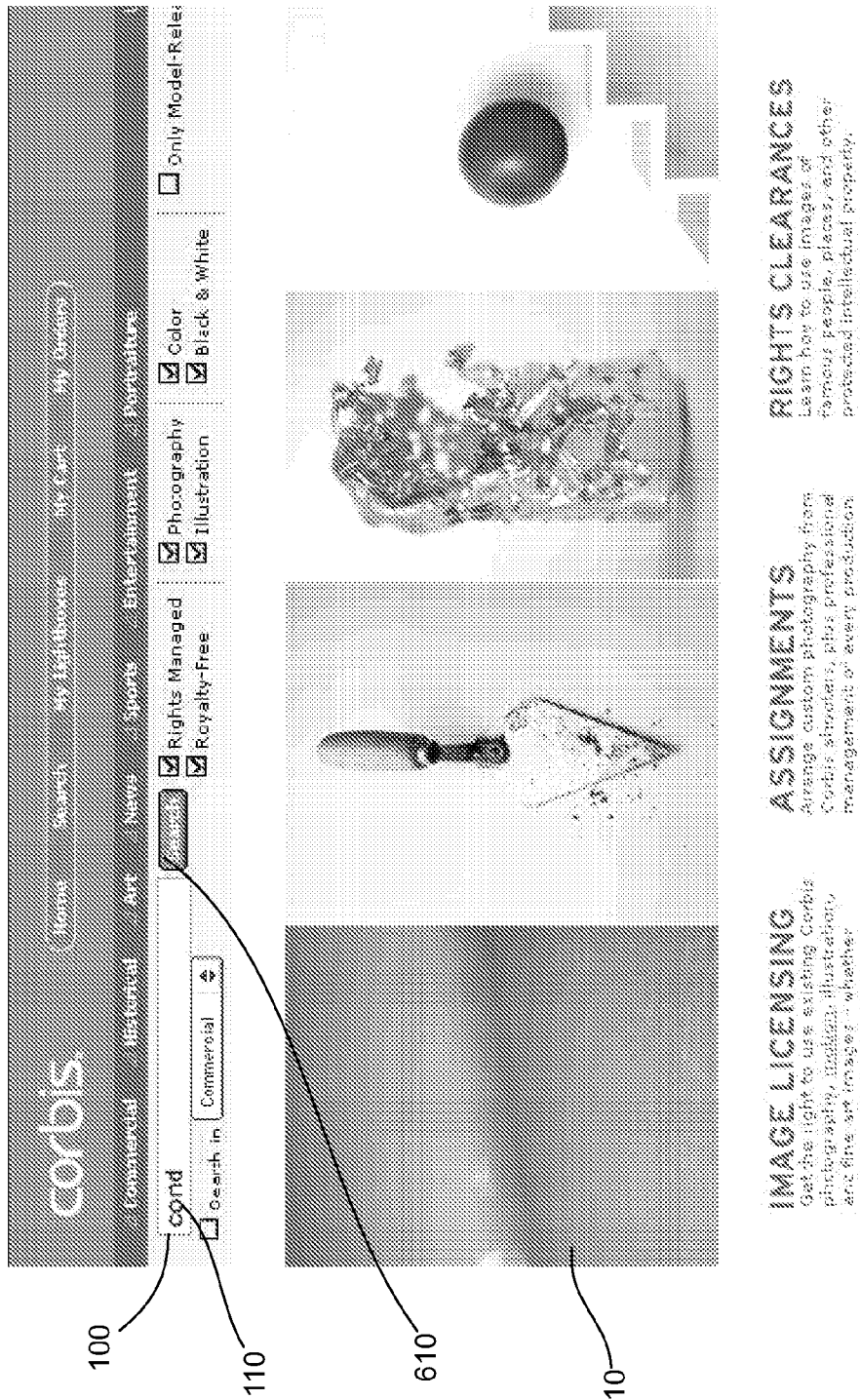
FIG. 5 is an example screen display of use of the search query receiver.

With continued reference to FIG. 1, in a typical application a user enters an initial query element into the search query receiver 100. Entry of the initial query element can be accomplished by any appropriate means, depending on, for example, the needs of the application involved and the information system being searched and/or otherwise navigated. For example, entry could occur by means of typing on a keyboard, using a stylus, using a voice prompt or video input, or through use of any alternate method of input. In a typical application, the initial query element might be a text search string entered into the search query receiver 100 (which can be implemented, for example, as a conventional search box or browser text object) by way of a keyboard. One implementation example of a search query receiver 100 and a portion of an initial query element 110 is shown in FIG. 5.

With continued reference to the system of FIG. 1, as the user enters the initial search query, the query controller 200 running on, for example, the server 30 (or alternatively as a software application or client-side application) interrogates the controlled vocabulary database, designated at 300, to find "matches" (functionally denoted at 400 in FIG. 1) to the "incremental" user input initial query element (such as is shown at 110 in FIG. 5) entered thus far. In the illustrated embodiment, these "matches" are semantic and/or lexically-related alternatives to the initial query element string or prompt entered or initially provided by the user. As is shown in FIG. 1, the semantically and lexically-related alternatives are "dynamically" retrieved from the controlled vocabulary database 300 by way of the query controller 200. Moreover, the query controller 200 passes, via network 20, the alternatives to client environment 10, and the semantically and lexically-related alternative query elements are displayed dynamically and in substantially real-time by way of the search query element viewer 500. Preferably, the alternative query elements are displayed in real time as the user enters the initial query element. Hence, the displayed alternatives are updated and refined as the user continues to enter or add to the initial query element. One example of this functionality is represented in the example search and navigation palette 10 shown in the example of FIG. 6, which denotes an example search query element viewer at 500, along with dynamically generated alternative query elements denoted at 508.

As noted, lexically-related query elements are identified, retrieved and displayed via the search query element viewer 500 "dynamically." As used herein, the term "dynamic" or "dynamically" means substantially real-time, such that retrieval and display of the alternative query elements is substantially instantaneous in response to an action by the user. In preferred embodiments, this dynamic presentation is provided by way of a search query element viewer that is implemented as a dynamically-generated object that can be implemented with any appropriate dynamically-generated screen or device object, function or method. In one presently preferred embodiment, the dynamically-generated object is provided by way of a client-side iFrame object or a drop-down menu object. The dynamic objects, such as might be provided with an iFrame object, can also include any variety of screen or device objects such as drop-down menus and text areas.

Once displayed via the search query element viewer 500, the user can select any of the alternative query elements to further refine the initial query by resubmitting the selection to the search query receiver and identifying lexical alternatives to that submitted query. Alternatively, the user may select one of the alternatives and submit that as a search term for use in searching the information system of interest.

The semantically and lexically-related elements (such as those denoted at 508 in FIG. 6) dynamically displayed via the search query element viewer 500 preferably semantically and/or lexically relate both to the user's initially entered search criteria, and to the information system that is being searched or otherwise navigated. Alternatives can consist of full or partial words or symbols that represent or otherwise relate to the lexicon of the information system being searched, and to the query element entered in the search query receiver 100. The relation of alternate lexical elements can be based on a pre-defined, controlled or structured vocabulary stored within the controlled vocabulary database, which is designated at 300 in FIG. 1. As will be described further below, any one of a number of different relationships can be defined depending on the needs of a particular application. In general however, the term "lexically-related" includes any items such as words, concepts, objects, entities, etc. that are part of and reside in the controlled vocabulary database and that are "connected" by virtue of some relation, be it linguistically (e.g., broader/narrower), functionally associated (e.g., "door" is associated with "house"), financially (e.g., price, discount, time limit), visually (e.g., photo examples of a product), alternatives or options, etc., with the lexicon of the information system of interest. In addition, in alternate embodiments, the nature of the relationship between the search query element entered in the search query receiver and the lexically related alternatives retrieved from the database and displayed in the search query element viewer might be specified by way of wildcard operators included within the specified search query element. For example, a predetermined connector (such as a '+' character) could be used to indicate that non-contiguous words are extracted from the controlled vocabulary database (e.g., if the user enters "learn+alc" a result of "Learned behavior is . . . of alcohol abuse" might be returned). Similar types of "relational" operators and techniques could be used.

By way of example and not limitation, lexically-related alternatives can include corresponding broader terms, narrower terms, associative terms or synonyms, homograms, associatively-related terms, tags, sub-strings, symbols, portions of titles or captions, content of knowledge bases or meta-words and/or other controlled vocabulary pre-defined or pre-structured informational elements contained within the controlled vocabulary database. Lexically-related alternatives can include complete sentences or portions of sentences. Symbols can be graphical representations such as icons, or can be conceptual, or linguistic such as Chinese script and characters. Lexically-related elements could also include translation equivalents for other languages such as Chinese or German. Depending on the application, lexical alternatives could be prices, special offers, and the like, or could be in the form of non-visual alternatives such as might be provided by way of voice prompts provided via a mobile device.

The relation of alternate lexical elements can be based on a pre-defined, controlled or structured vocabulary stored within the controlled vocabulary database 300. One example might be a thesaurus-derived vocabulary, which includes synonyms of words/phrases in the information system to be searched. That vocabulary may be developed manually or as computer-generated and extracted keywords, concepts, or phrases. Such computer-generated content may be the result of clustering, extraction, or similar summarization techniques wherein vocabulary elements may be related by virtue of parent/child (broader/narrower), synonym (associative), tags, definitions, labels, categories or similar such semantically related associations.

Creation of a controlled vocabulary database 300 in accordance with the above objectives would occur for any given "information system" of interest. For example, a database might be constructed for a particular commercial website (e.g. www-pcconnection.com), government website (e.g. www-uspto.gov), or an information system located on a corporate intranet. The controlled vocabulary database would likely be updated on a regular basis, especially if the content of the corresponding information system changes or otherwise evolves.

Figure 2A:
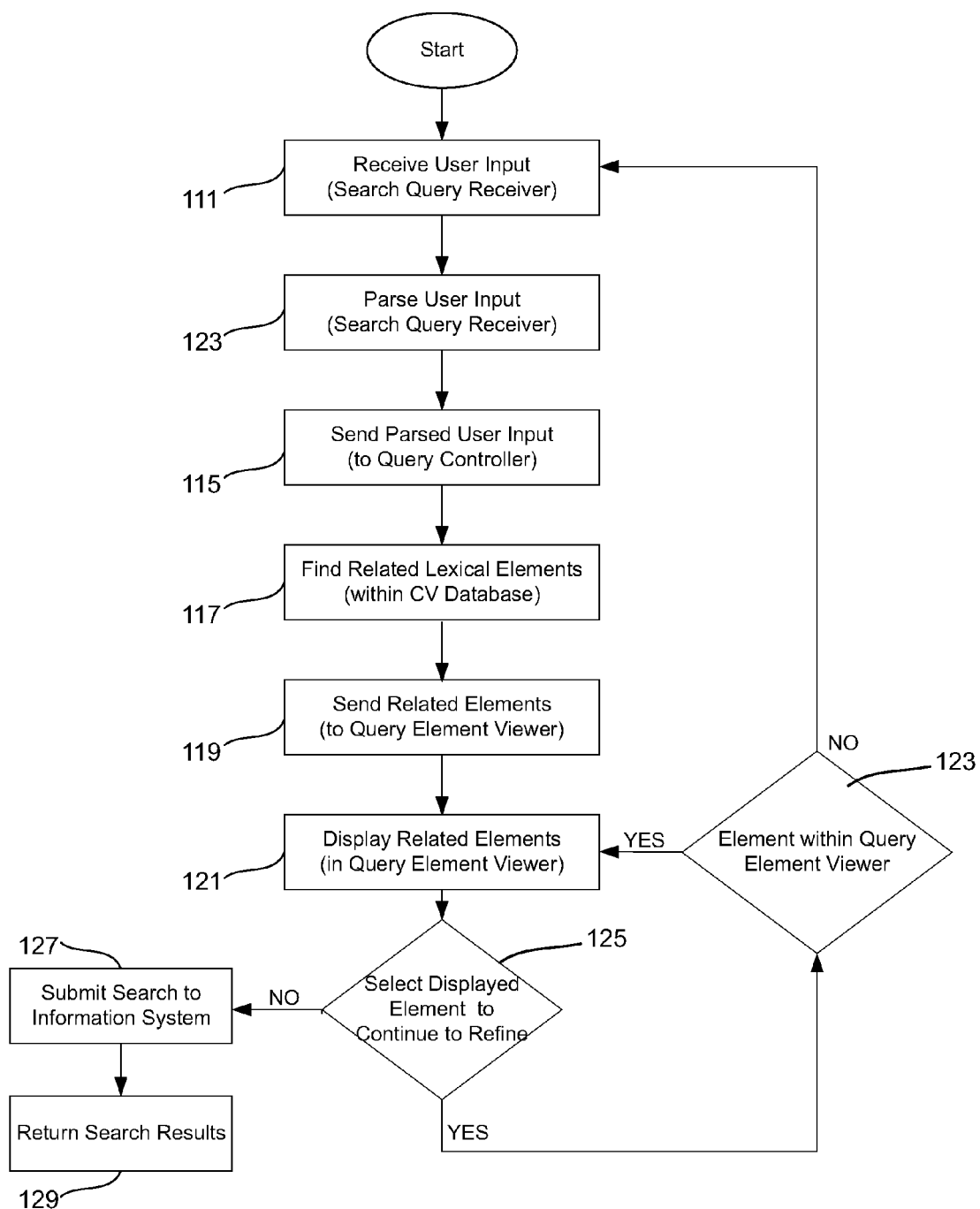
FIG. 2a is a flowchart illustrating one example method of the present invention.

Continued reference is made to FIG. 1 along with FIG. 2a, which illustrates one embodiment of a process flow that can be used to interrogate the controlled-vocabulary database, and dynamically display lexically-related alternatives to a user. Where needed, reference will also be made to FIGS. 4-12b which illustrate various example implementations of concepts in FIG. 2a. Beginning at step 111 in FIG. 2a, a user input query element, such as a textual string (e.g. 110 in FIG. 5) is received via the search query receiver 100 of the search and navigation palette 10 at the client. Depending on the implementation, the query element can be received "incrementally" and the search query receiver 100 accepts the user's entry of the initial query string (or voice prompt, or any other appropriate entry depending on the application) on a word-by-word or character-by-character basis and creates an "incremental" query which is passed via a network 20 and a server 30 to the query controller 200. This is denoted at process step 113 in FIG. 2a. In one embodiment the search query receiver 100 can be monitored by either javascript or other client-side (user device) code that resides in the HTML or DHMTL or other type of page or document specific to the information system to detect an event. In one embodiment the query controller 200 is software written in any of several programming languages such as Java, C, C++, PHP. It will be appreciated by those familiar with the art that the mechanism by which the client requests data from the server 30 might utilize code such as a XMLHttpRequest request object, a page or document load via a request such as a servlet or a CGI call, or a direct database query using for example JDBC. Of course, any one of a number of different techniques and approaches could be used to provide this functionality, as will be appreciated by one of skill in the art.

Figure 6:
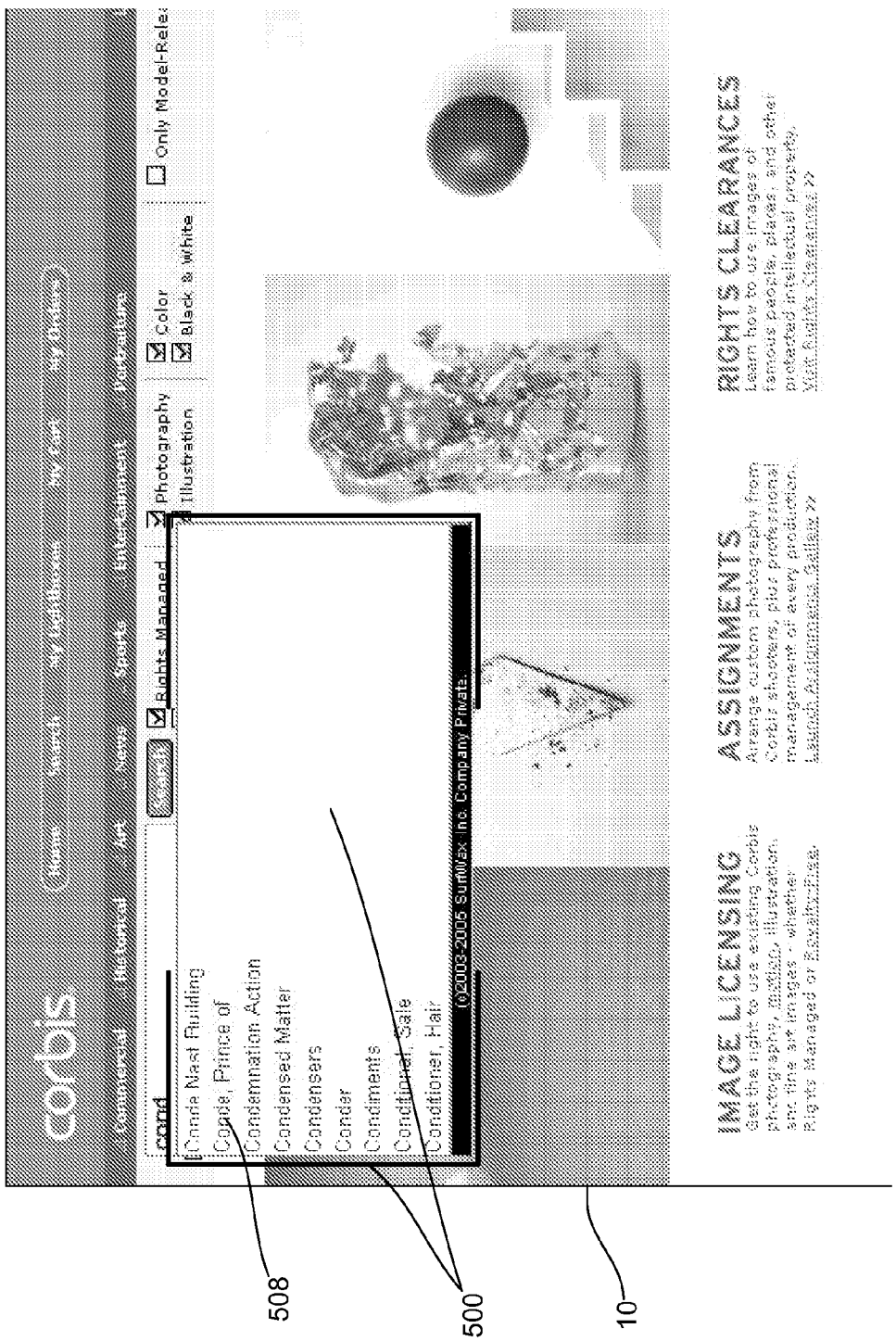
FIG. 6 is an example screen display of use of the search query element viewer with matched elements.
Figure 7:
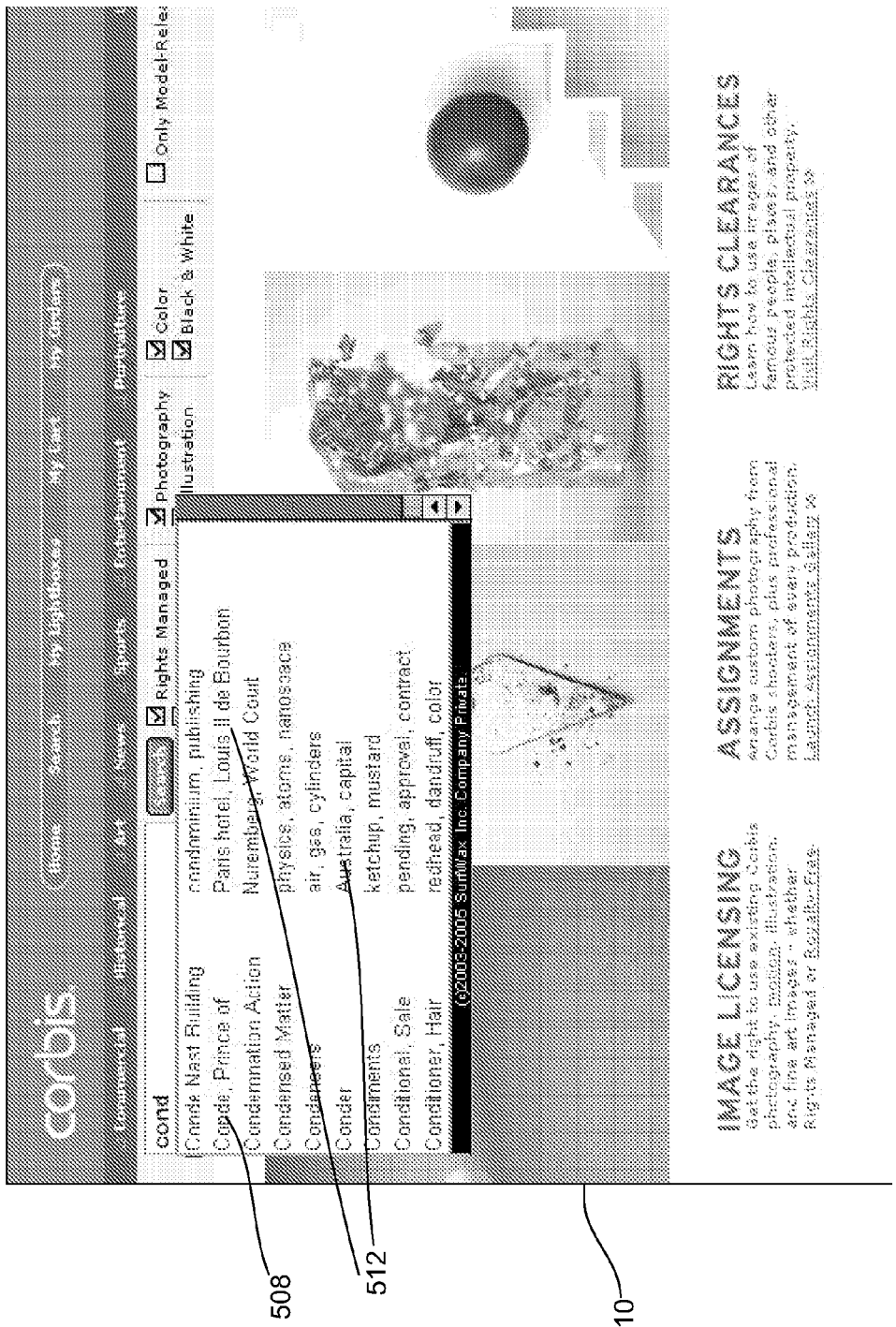
FIG. 7 is an example screen display of use of the search query element viewer with semantically- and lexically-matched elements.
Figure 8:
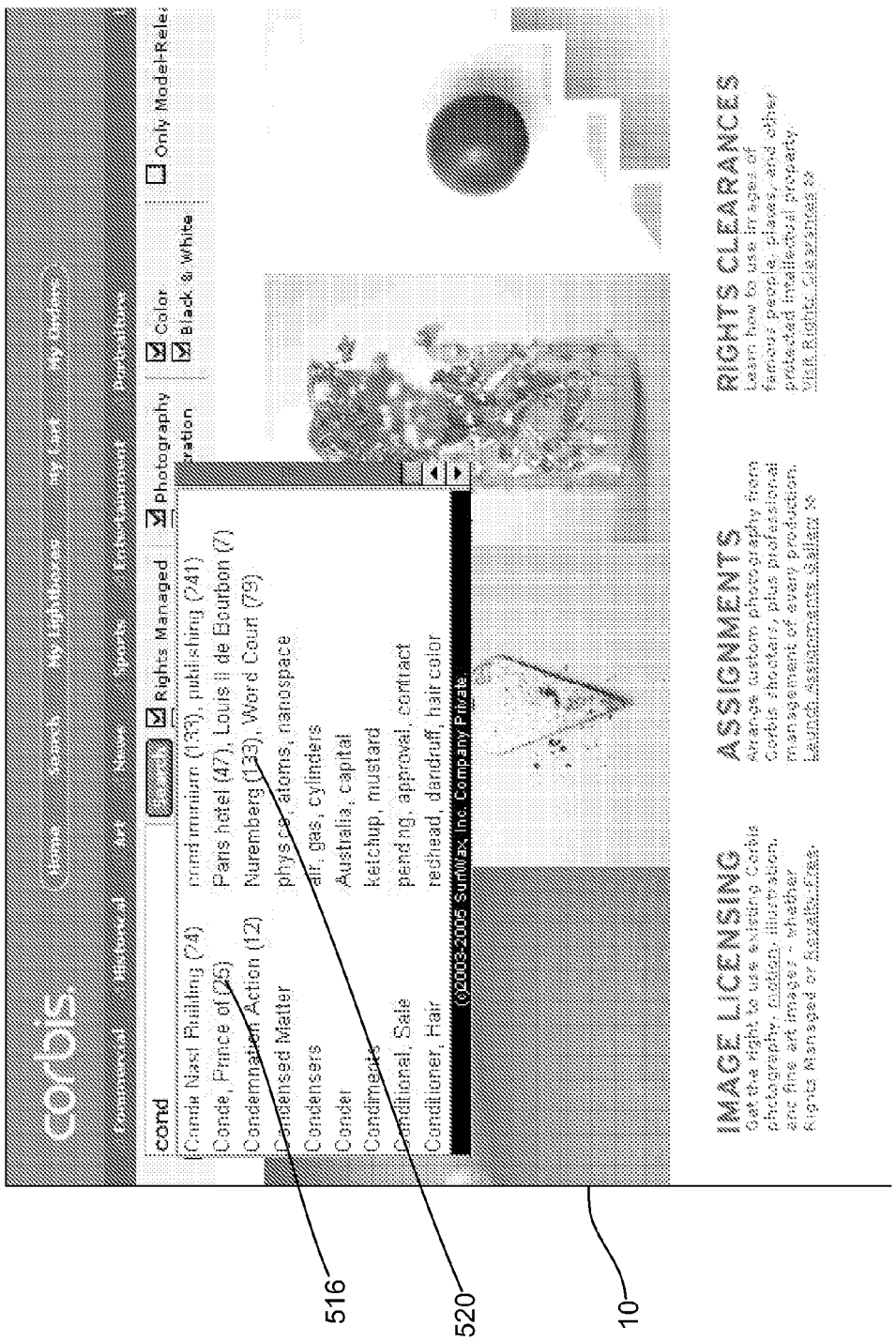
FIG. 8 is an example screen display of use of the search query element viewer with semantically- and lexically-matched elements with sample qualifiers.
Figure 9A:
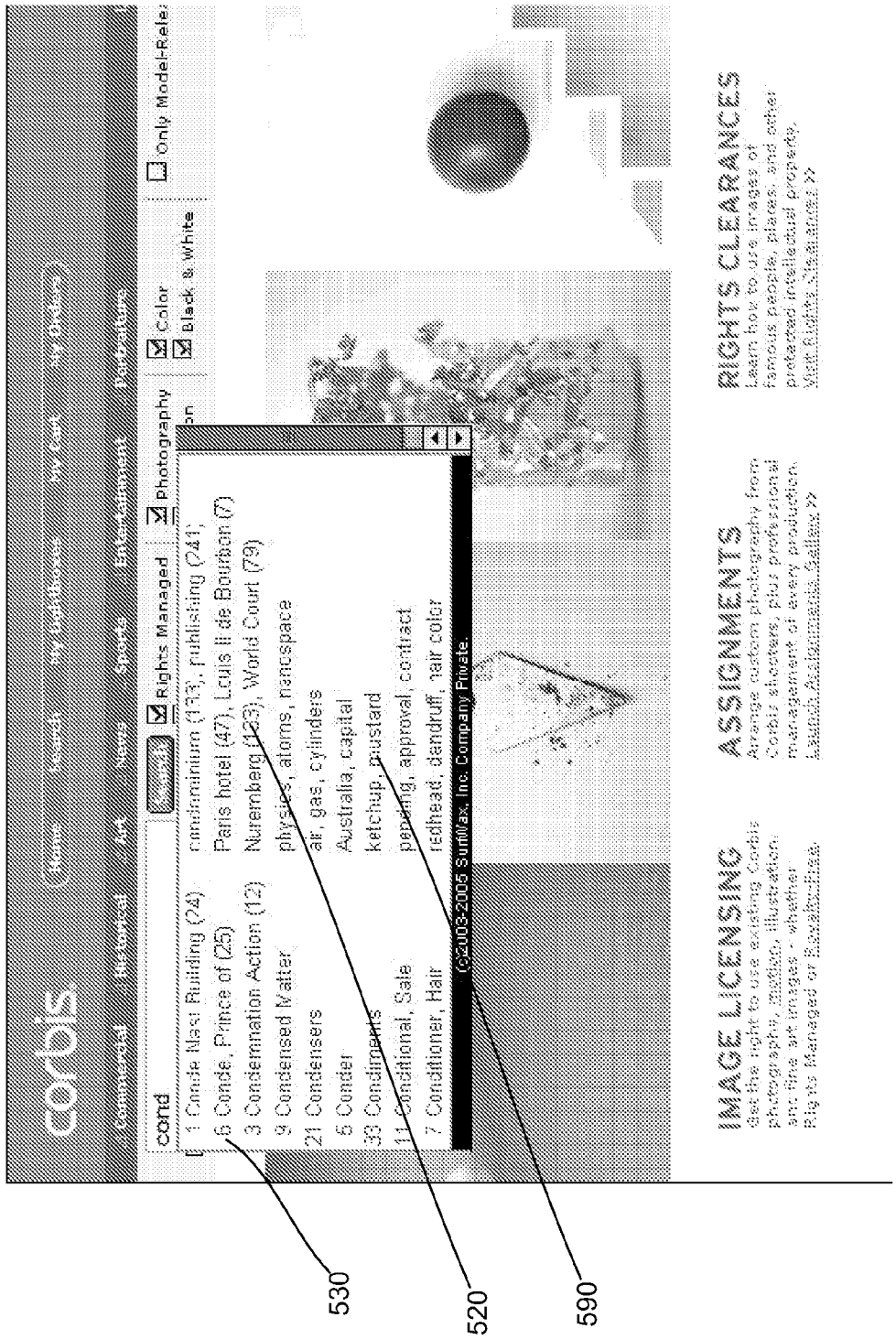
FIG. 9a is an example screen display of use of the search query element viewer with semantically- and lexically-matched elements with sample depth (sub-string) indicators.
Figure 9B:
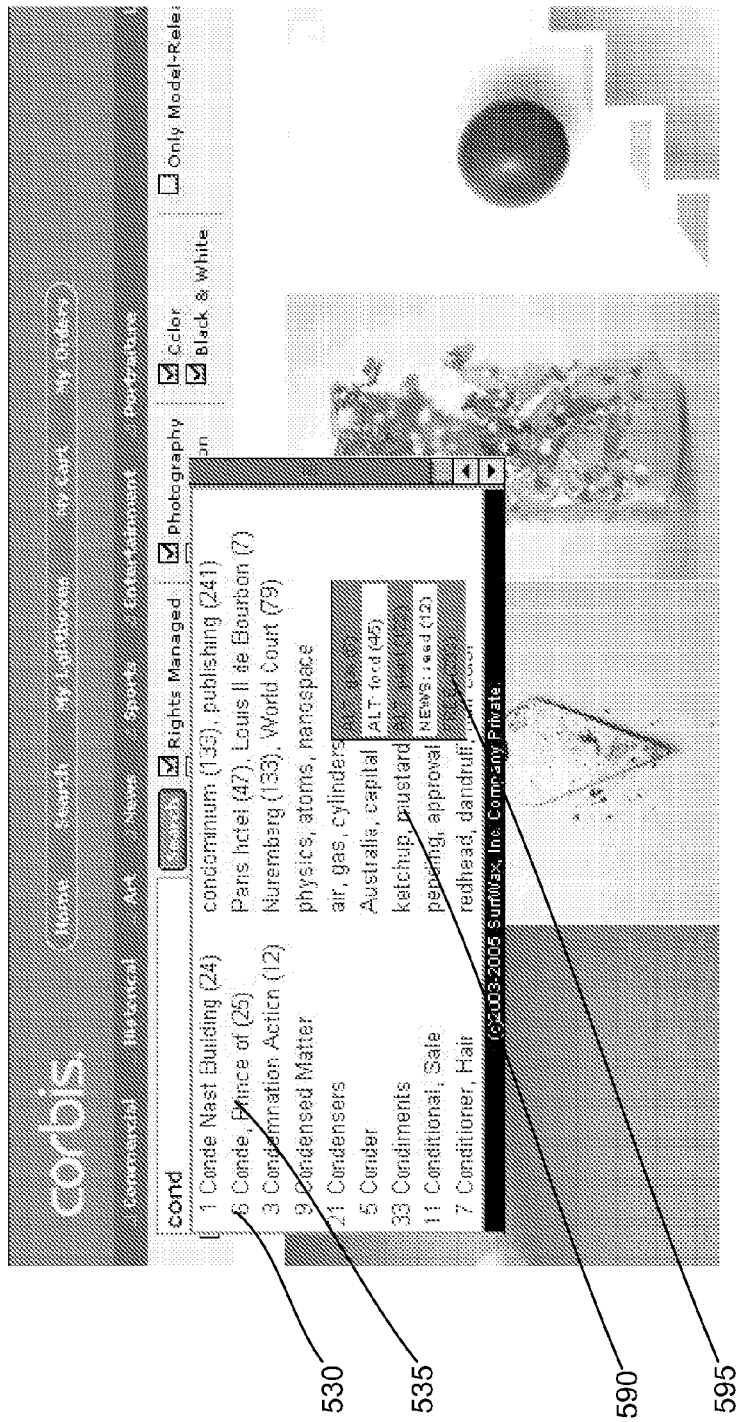
FIG. 9b is an example screen display of use of a secondary layer over the search query element viewer with semantically- and lexically-matched elements.

As the query controller 200 receives the user input, the controlled vocabulary database 300 is dynamically "interrogated" so as to identify any lexically-related alternatives to the initial query thus far entered by the user, as is denoted at process step 117. In this particular example the interrogation is in the form of an index lookup using any of numerous conventional methods for indexed search against a database. For matches found in the controlled-vocabulary database 300, the query controller 200 returns to the search query element viewer 500 (for example, via the server 30 and the network 20) lexically-related alternative elements and displays them to the user. This is represented at process steps 119 and 121. Again, this interrogation of the database 300 and presentation of lexical alternatives occurs dynamically—in substantially real time as the user is entering an initial query element. An example of this dynamic presentation is shown in FIGS. 6 and 7, showing example lexically-related elements at 508 and 512. As previously noted, in different embodiments, the lexically-related elements can be broader, associative, tags, terms, strings, sub-strings, symbols, voice prompts and the like, depending on the particular application and configuration of the controlled-vocabulary database. Also, as is represented in the embodiment of FIGS. 7 and 8 lexically-related elements such as 508 and 512 (FIG. 7) and any associated symbols or navigational aides such as is denoted at 516, 520 (FIG. 8) are passed to the search query element viewer 500, such as data that already contains display markup coding from the query controller 20 such as HTML, or such as AJAX-based raw data that is interpreted and displayed by the client. In one embodiment the alternate lexical elements, for example "ketchup" and "mustard" 590 as shown in FIG. 9a can be separated or delimited by commas, a graphical separator, or other meaningful cue to denote separation between alternate groupings of lexical elements.

As is denoted at process step 125, the user can dynamically interact with the search query element viewer 500. For example, the user can "select" which of the displayed lexically-related elements best matches the user's search or query intent. At process step 125, the user can click on an alternate lexical element (such as 508 or 512 in FIG. 7), and the selected element is submitted as the search query to the information system (represented at step 127), resulting in a return of corresponding search results (one example of which is shown in FIGS. 12a and 12b).

Alternatively, by using the lexical elements, symbols, and navigation aides associated with the initial search query and the alternatives provided within the search query element viewer 500, the user may iterate this process, such as is represented at process steps 123 and 125 in FIG. 2a, numerous times to find the best alternative element within the alternative elements shown in the search query element viewer 500. When the user has found the desired query element, they can either click directly on the lexically-related alternative element (for example 508, 512 in FIGS. 6 and 7) or they can click on a Search button 610 as shown in FIG. 5 or any input means to submit the then current search query (e.g., "condominium" in FIG. 12b) to the information system which returns search results 620 as shown in FIG. 12a in the conventional formats such as the title, URL and description, or as images such as shown in FIG. 12b or in any other format appropriate to the content of the information system such as video or audio.

A number of variations and alternatives can be provided in connection with the general process of FIG. 2a. For example, FIG. 9b demonstrates how a user might pass a selection device, such as a mouse or stylus, "over" the desired alternative lexical element, for example over 535, 550, or 590, and a secondary layer such as a pop-up, window, or other device object 595 (that may be temporarily displayed or is always displayed) on top of or within the search query element viewer 500 with additional alternative elements or clarifying data such as element type, date, category, or class wherein the user can select from this secondary layer to invoke actions similar to what otherwise could be achieved by selecting elements 508 or 512 (e.g., FIG. 7).

In another embodiment, alternative lexical elements displayed in the search query element viewer 500 may be displayed with associated toggles, icons or other graphical representations through which the user can directly invoke preferences such as logical switches, display options, etc.

In another embodiment, any one of an array of numbers or symbols (such as 516 and 520 shown in FIG. 8) returned to the search query element viewer conveys to the user, before the user submits their search query, the "depth" or number of potential search results that will be returned by submitting that lexical element as the query to the information system. In this embodiment the indication of "pre-results" (for example a count of potential search results or hits, or an indication of the number of other lexically-related elements related to the user input 110 or are contained 530, FIG. 9*a*, within the user input 110) to the user helps the user decide if they need to "drill down" more or if the associated lexical element is the one they want to submit as their search query.

In another embodiment, the user clicks on or selects any one of an array of numbers or symbols (e.g., 516 and 520 in FIG. 8) associated with a lexical element which functionally causes the lexical element associated with the selected number to be loaded into the search query receiver 100 and that lexical element automatically submitted to the query controller as a new query string/sub-string resulting in a new display of alternative lexical elements related to this new query in the search query element viewer 500. Of course, the interaction with, or selection of an alternative lexical element can be by way of the search query element viewer 500 exclusively, i.e., resubmission via the search query receiver 100 is not necessary depending on the particular implementation.

In another embodiment, as an alternate form of lexical relationship, when the query controller 200 interrogates the controlled vocabulary database 300, the query controller finds and counts all the strings and expressions within the controlled vocabulary database 300 that "contain" the lexical element 508. This count may alternatively be returned as part of the associated symbols or navigational aides 530, such as are shown in the example of FIG. 9*a* and passed to the search query element viewer 500. For example, if the lexical element 508 is "George Bush," the value returned (530 in FIG. 9*a*) will be an "instance counter" of all the instances within the controlled vocabulary that contain the string "George Bush," such as "The President George Bush" and "She is the wife of George Bush."

Figure 3:
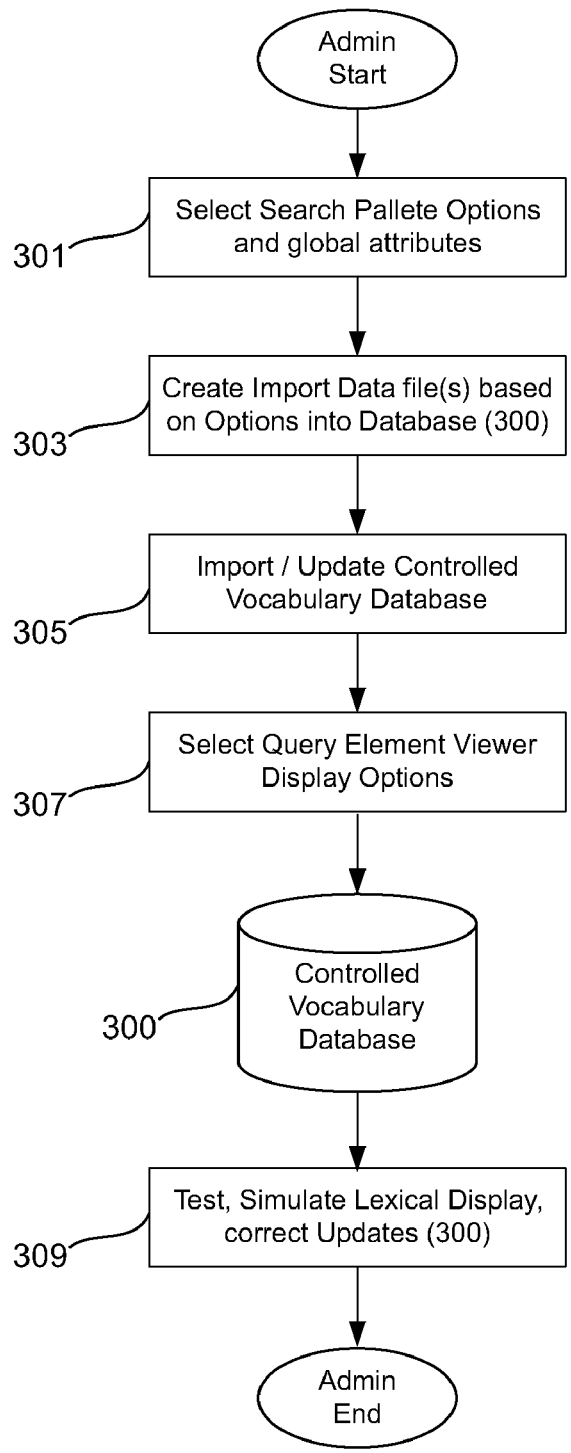
FIG. 3 is a flowchart illustrating one example of how a "controlled vocabulary" is implemented and maintained.
Figure 4:
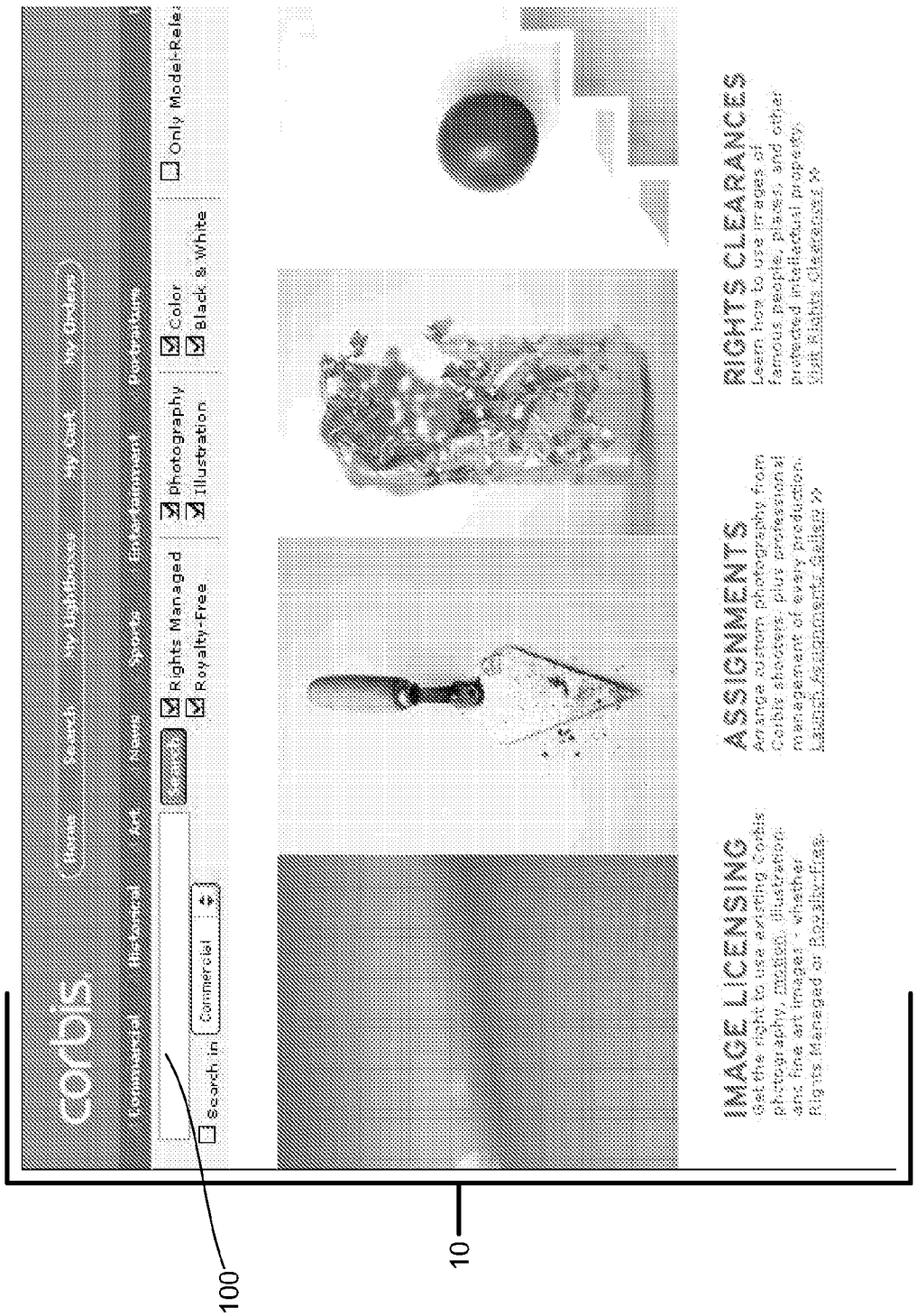
FIG. 4 is an example screen display of a search query receiver [SQR]
Figure 10:
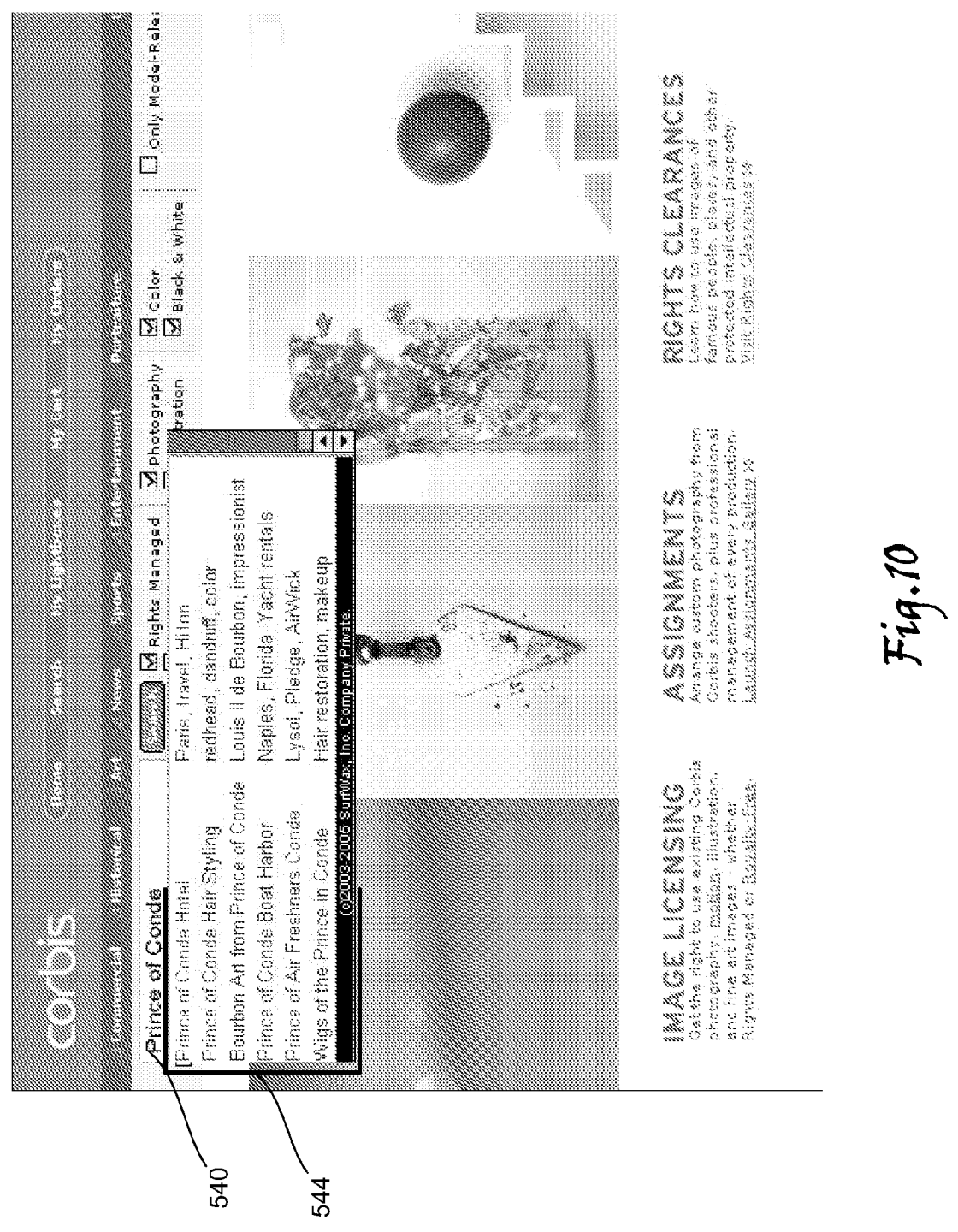

The interrogation by the query controller 200 of the controlled vocabulary database 300 may be based alternatively on any of several Boolean or other linguistic comparison methods (which can be selected by the information system Administrator as globally applicable, or can be selected by the user under Preferences as is represented in the example "administration" process of FIG. 3). Boolean or other linguistic comparison methods can include "exact" string matches so that only lexical elements containing just the exact string "George Bush" are returned, or an "approximate matches" "fuzzy-logic contains near" matching that returns lexical elements that contain the words George AND Bush such as "He stood behind the bush with George," or so that lexical elements containing any of the words George OR Bush are returned 544 (or as shown in FIG. 10. any related lexical elements or strings containing the words "Prince of Conde" or rotated versions thereof). In this example the lexical element 535 can be passed by the client browser 10 or server 30 to the search query receiver 100 and then become the new query string 540 in the search query receiver as shown in FIG. 10.

Figure 11:
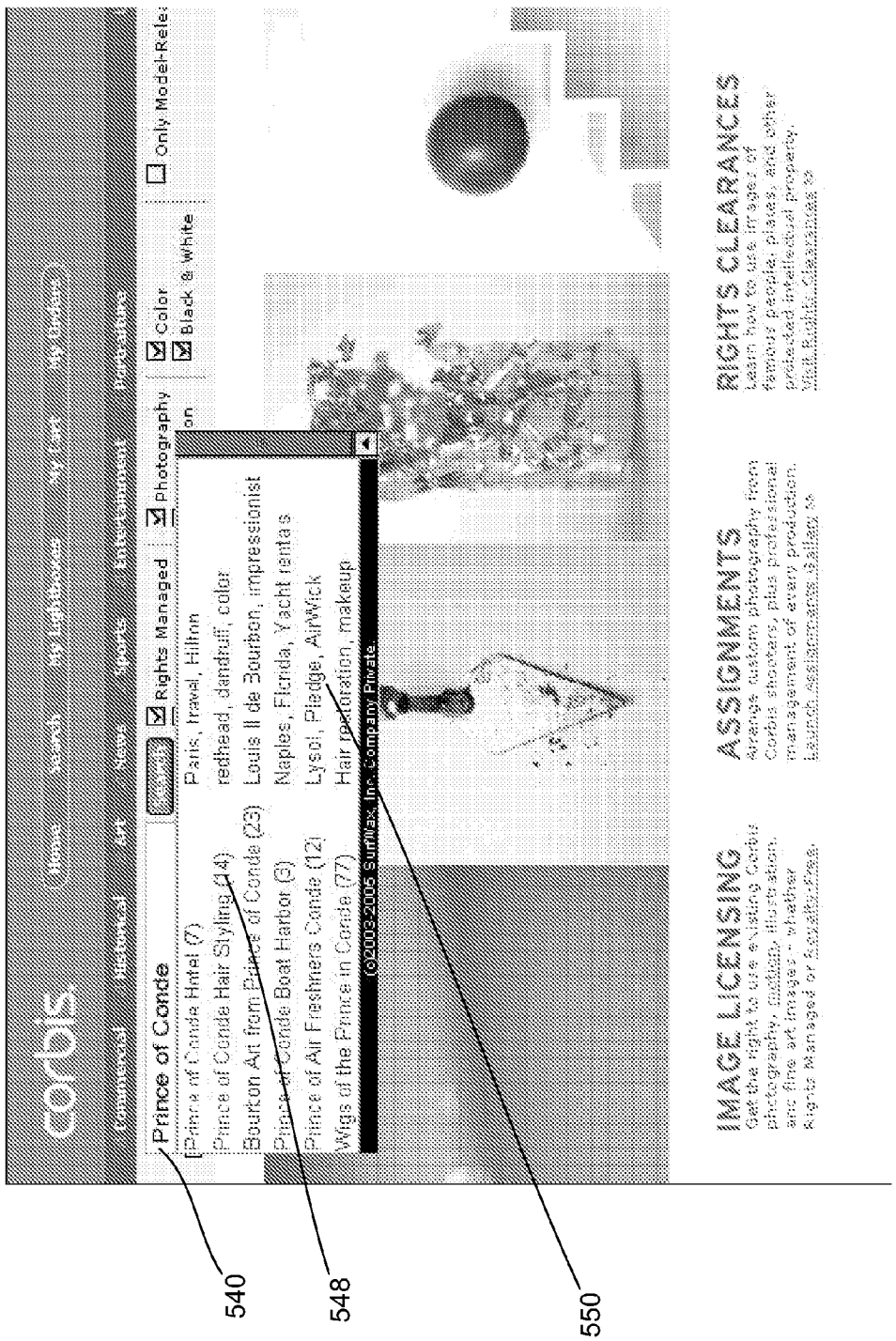
FIG. 11 is an example screen display of use of the search query receiver and the search query element viewer with additional semantically- and lexically-elements matched to the depth (sub-string) indicators.

In one embodiment the user may set preferences to select what type of alternative lexical elements are displayed in the search query element viewer 500 (for example related terms, such as 512 in FIG. 7 or 550 in FIG. 11) or how the lexical content is displayed (for example, color preferences, symbol preferences instead of numbers 520 in FIG. 8 or 548 as shown in FIG. 11).

In another embodiment the lexically-related content from the controlled vocabulary database that is displayed in the search query element viewer might consist of translated equivalents of what the user has entered. Thus in one example, if the user selects "English" from a switch object such as a checkbox or drop-down menu or from their preferences, as they enter "netw" in the search query receiver, the search query element viewer could be implemented to display multiple columns, the first of which displays all matching English-based words containing "netw . . ." and additional columns, each for a different language such as German or Chinese, and in each of these respective columns the search query element viewer will display a row of the translated equivalents of the English word(s) appearing in the first column of the row.

It will be appreciated that the column/row format for displaying multiple relationships/groupings, be they between languages such as English or German or Chinese, or between broader, narrower terms, etc., is just one format possible for displaying content within the search query element viewer. Other formats or methods to designate such "groupings" might include "mouse over" AJAX-based windows or other pop-up objects, word-wheel-type arrangements, visual models, graphical clusters, price arrays, and the like, depending on the needs of any given application.

Figure 2B:
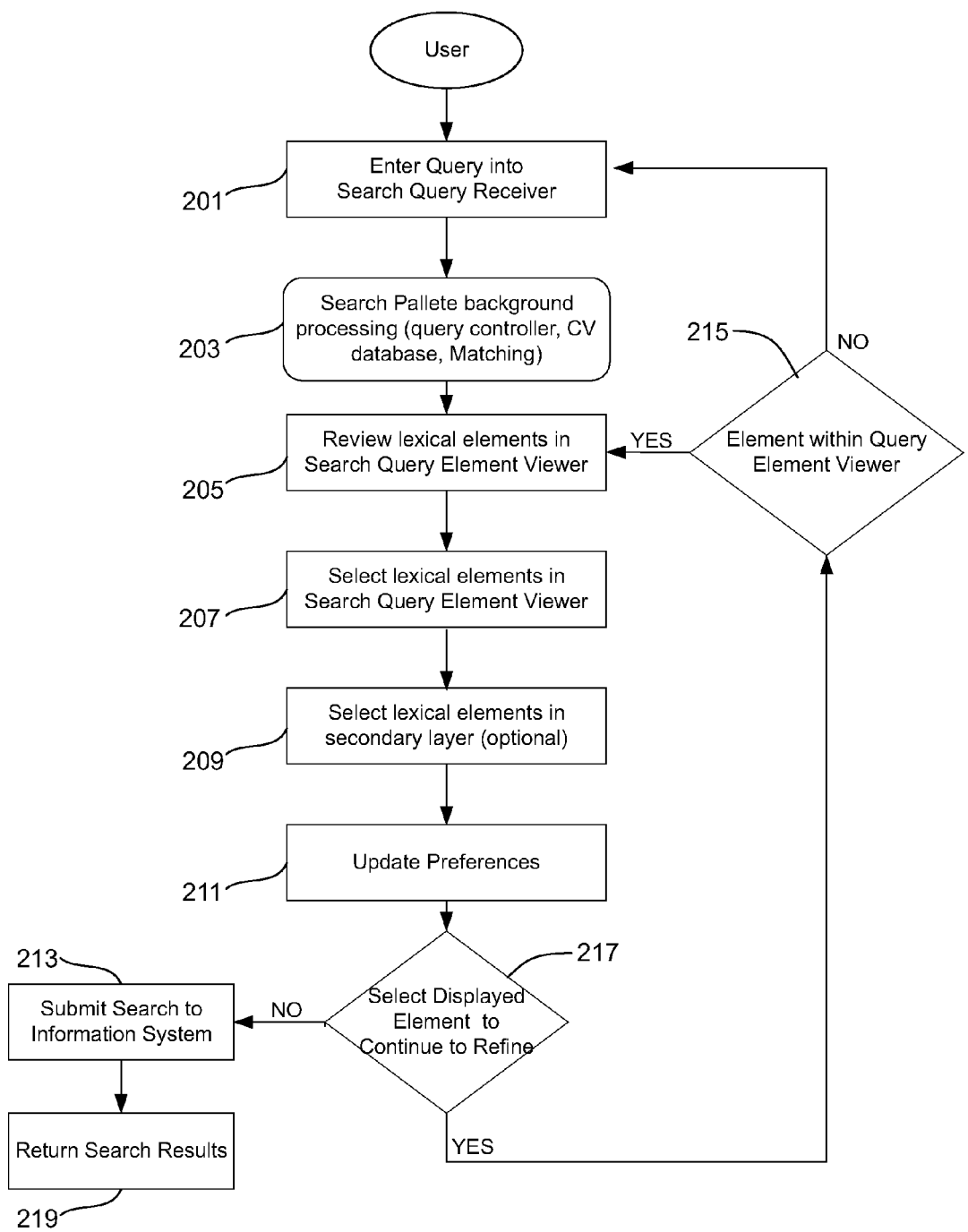
FIG. 2b is a flowchart illustrating an example of the user's interaction with an example embodiment of the present invention.

The notion of displaying different "groupings" of lexically-related alternatives, such as in multiple columns (for example, 508 and 512 in FIG. 7 and 548 and 550 in FIG. 11), wherein each group might have a different semantic or lexical relationship to the query element (e.g., 540 in FIG. 540), is represented in the example process flow of FIG. 2*b*.

It will be appreciated by those of ordinary skill in the art that other embodiments do not necessarily require the back-end of a network 20 or server 30 such as is shown in the embodiment of FIG. 1. Using this approach, the query controller 200 and controlled vocabulary database 300 can reside solely within a LAN or within a single-user computer, such that the single-user (standalone) computer runs an application (software) local to the computer's operating system that creates the search query receiver function 100 and a form of the search query element viewer 500 in association with a localized database 300 located on the user's computer, or alternatively a controlled vocabulary database that is accessed across the LAN or network 20.

It will be appreciated by those of ordinary skill in the art that in another embodiment the present invention and the search query element viewer/dynamic semantic list object can be used with RSS aggregation technology and tools in conjunction with controlled vocabularies, keyword sets such as those available from third parties, and all lexical elements associated with such vocabularies.

In yet another embodiment, the search query element viewer 500 can be associated with an information system's individual pages and documents so that as the user enters a query into the search query receiver 100, non-structured lexical elements such as titles, keywords, phrases from the information system's pages or documents can be displayed in the search query element viewer from which the user can select an element for the purposes of navigating between pages or documents. For example, a Web site dealing with U.S. History is a form of an information system and as such, it may have thousands of pages, each with a title and content. In an example embodiment, the user could enter into the search query receiver "linco" and see within the search query element viewer all that Web site's pages that have Lincoln in the title or body of the page or document.

In still another embodiment the lexical elements of an information system displayed and selectable from within the search query element viewer could also include facts such as those from the CIA FactSheet site on countries, definitions, part numbers, page abstracts or key points, etc.

In another embodiment, instead of pre-defined or pre-structured informational or lexical elements, the controlled vocabulary can be generated on-the-fly or dynamically from structured or unstructured data through use of clustering or extraction technology such as ExtractSum™ from Surf-Wax®. In this embodiment, which might be used for example with a Web site, the web pages on the site are parsed in real time and titles and keywords and concepts extracted and related using a series of dictionaries, word grouping and/or clustering techniques. These extracted items become lexical elements appropriate for that Web site (information system) and are thus available for use within the search query element viewer.

As part of the back-office capability of one embodiment of the present invention, an administrative system 700 and interface, such as might be implemented in accordance with the process steps of FIG. 3, allows the information system Administrator to load and maintain the controlled-vocabulary database along with setting global attributes and default user preferences for displaying the content within the search query element viewer.

It should also be appreciated that while, for purposes of clarity and convenience, the example embodiment of FIG. 1 and corresponding description illustrate the use of a single search query receiver 100, that applications might utilize multiple search query receivers within a single search environment application. For example, a representative embodiment might include more than one search query receivers 100 within the same search page/environment. The search query receivers could be implemented to interact with one or more query controller(s) 200 which are in turn interfaced with one or more controlled vocabulary databases (300). Each search query receiver 100 could have its own search query element viewer/dynamic list object. For example, there could be a search query receiver labeled "authors" and another labeled "titles." As the user interacts with the "author" search query receiver, the corresponding search query element viewer might show lexically-related content, such as author names. When the user interacts with the search query receiver for "titles," the corresponding search query element viewer will contain lexically-related content, such as book titles. In a related application, the lexically-related element selected from one search query element viewer could be used to automatically (based on similar lexical relationships as previously discussed) constrain the vocabulary values appearing in the second search query element viewer for "titles." For example, if the user enters "Hemi" in the author search query receiver and then selects "Ernest Hemingway" in the author search query element viewer, then when the user starts to enter/interact with the titles search query receiver, only titles lexically related to the author Ernest Hemingway might appear in the Titles search query element viewer, such as "Old Man and the Sea" and "For Whom the Bells Toll."

In a related variation, multiple lexicons could be served/accessed from one search query receiver. For example, the user may switch between lexicons (or portions thereof) using a separate screen object such as a pull-down menu or check-boxes that permit selection of one lexicon from multiple lexicons such as Author or Titles or ISBN. Then whatever the user enters in the single search query receiver, based on the switch selected by the user, the single search query element viewer will display/contain values from the respective lexicon. In this embodiment one search query receiver and its respective search query element viewer can provide access to multiple lexicons. Other variations on these above themes could be provided.

It will be evident that there are numerous embodiments of the present invention, which, while not specifically described above, are clearly within the scope and spirit of the invention. Consequently, the above description is considered to be exemplary only, and the full scope of the invention is to be determined solely by the appended claims.

What is claimed and desired to be secured by United States Letters Patent is:

1. A method for identifying a query element suitable for use in search refinement and navigation in connection with an information system of interest, the method comprising the steps of:
    receiving a query element on a character-by-character basis entered by a user at a client computing device;
    upon receipt of each entered character of the query element, searching for one or more alternative query elements contained in a first computer-based database, the first database being separate from the information system of interest, the one or more alternative query elements having a predetermined lexical relationship to a received portion of the query element;
    for each entered character of the query element resulting in the location of one or more alternative query elements, presenting the one or more alternative query elements to the user via a visual display operably connected to the client computing device and wherein the one or more alternative query elements are presented to the user in a manner that complies with at least one predefined preference; receiving an alternative query element selected by the user; and
    optionally navigating the information system in accordance with the selected alternative query element.

2. The method as recited in claim 1, wherein the query element is received at the client computing device via a client browser environment presented via the visual display, and wherein the client computing device, the information system of interest and the first database are interconnected by way of a network.

3. The method as recited in claim 2, wherein the network is a wide area network (WAN).

4. The method as recited in claim 1, further comprising:
    optionally searching for one or more alternative query elements contained in the first computer-based database, the one or more alternative query elements having a predetermined lexical relationship to the selected alternative query element.

5. The method as recited in claim 1, further comprising the steps of:
    for each of the one or more alternative query elements, determining a number of potential search results that would be returned in the event that the information system were searched using the alternative query element; and
    for each presented alternative query element, presenting to the user the determined number of potential search results.

6. The method as recited in claim 1, wherein the step of searching one or more alternative query elements comprises the step of searching a previously indexed first computer-based database for a content that satisfies a predetermined match criteria, wherein the matching content is returned as the one or more alternative query elements.

7. The method as recited in claim 1, wherein a plurality of alternative query elements are presented to the user, the plurality of alternative query elements falling within two or more groupings, each grouping having associated therewith alternative query elements that have a different predetermined lexical relationship to the received portion of the query element from that of another grouping.

8. The method as recited in claim 7, wherein the alternative query elements are presented so as to be visually associated with a given category.

9. The method as recited in claim 8, wherein each of the categories is presented so the respective alternative query elements of a given category are provided in a separate column from the alternate query elements of another category.

10. The method as reicted in claim 1, wherein the predetermined lexical relationship comprises a synonym.

11. The method as recited in claim 1, wherein the predetermined lexical relationship comprises a lexically narrower term.

12. The method as recited in claim 1, wherein the predetermined lexical relationship comprises a lexically broader term.

13. The method as recited in claim 1, wherein the predetermined lexical relationship comprises sub-strings.

14. The method as recited in claim 1, wherein the predetermined lexical relationship comprises a homogram.

15. The method as recited in claim 1, wherein the predetermined lexical relationship comprises a language translation equivalent.

16. The method as recited in claim 1, wherein the predetermined lexical relationship comprises a partial forms of terms.

17. The method as recited in claim 1, wherein the predetermined lexical relationship comprises title portions.

18. The method as recited in claim 1, wherein the predetermined lexical relationship comprises pre-defined information elements.

19. A method for identifying a query element suitable for use in connection with an information system of interest, the method comprising the steps of:
    a) associating a controlled vocabulary database with a remotely connected information system, the controlled vocabulary database comprising content that is related to at least a portion of a content of the remote information system, the relationship being dictated by one or more predetermined lexical and semantic criteria;
    b) receiving from a network connected client at least one initial query element;
    c) at substantially the time of receipt of a received portion of the query element, comparing the received portion of the query element to the controlled vocabulary database content and identifying content that satisfies a predetermined match criteria, wherein the matching content comprises one or more alternative query elements;
    d) at substantially the time of identification, forwarding the one or more alternative query elements to the network connected client for presentation to a user;
    e) upon selection of an alternative query element by a user, receiving the selected alternative query element from the network connected client;
    f) performing a predetermined function against the remotely connected information system in accordance with the received alternative query element.

20. The method as recited in claim 19, wherein the predetermined function performed against the remotely connected information system comprises a keyword search of a content of the information system, wherein the keyword search comprises the received alternative query element.

21. The method as recited in claim 19, wherein the predetermined lexical and semantic criteria includes at least one of the following criteria: lexically broader terms; synonyms; partial forms of terms; sub-strings; graphical symbols having a predetermined lexical relationship; narrower terms; associate terms; homograms; sub-strings; title portions; pre-defined information elements; and foreign language translation equivalents.

22. A computer-based method for identifying a query element suitable for use in search refinement and navigation of a network-connected information system having a predetermined lexical content, the method comprising the steps of:
    a) in a client computing device that is operatively connected to an information system via a first network, visually providing a graphical search interface including a search query receiver and a search query element viewer;
    b) receiving input of a query element on a character-by character basis from a user via the search query receiver;
    c) forwarding of the received portion of the query element to a query controller;
    d) receiving a plurality of alternative query elements from a controlled vocabulary database via the query controller, the alternative query elements each having a predetermined lexical relationship to the forwarded portion of the query element;
    e) displaying the plurality of alternative query elements to a the user via the search query element viewer, wherein the step of displaying occurs dynamically as input is received via the search query receiver; and
    f) upon selection of an alternative query element within the search query element viewer by a the user, performing one of the following steps:
        (i) navigating the information system in accordance with the selected alternative query element;
        (ii) replacing the received portion of the query element with the selected alternative query element and repeating steps (c) through (d).

23. The method as recited in claim 22, wherein the controlled vocabulary database is locally connected to the client computing device.

24. The method as recited in claim 22, wherein the controlled vocabulary database is remotely connected to the client computing device via a network.

25. The method as recited in claim 24, wherein the network is the Internet.

26. The method as recited in claim 24, wherein the network is a Local Area Network (LAN).

27. The method as recited in claim 24, wherein the network is a Wide Area Network (WAN).

28. The method as recited in claim 22, wherein the query controller is implemented at the client computing device.

29. The method as recited in claim 22, wherein the query controller is implanted at a server computing device that is remotely connected to the client computing device via a network.

30. The method as recited in claim 29, wherein the network is the Internet.

31. The method as recited in claim 29, wherein the network is a Local Area Network (LAN).

32. The method as recited in claim 29, wherein the network is a Wide Area Network (WAN).

33. The method as recited in claim 22, wherein the information system is a WEB site, and the first network is the Internet.

34. The method as recited in claim 22, wherein the navigating step comprises the step of conducting a keyword search of a content of the information system, wherein the keyword used is the selected alternative query element.

35. The method as recited in claim 22, wherein the search query element viewer is implemented at the client computing device with a dynamically programmed screen object.

36. A method for dynamic refinement of a search query for use in connection with the searching of content within an information system, the method comprising:
    a) providing a dynamically generated graphical interface screen on a display of a client computing device including at least one search query receiver GUI input box and a corresponding search query element viewer display box;
    b) iteratively receiving portions of an initial query element via the search query receiver; and
    c) as the portions of the initial query element are received, displaying in substantially real time at least one grouping of alternative query elements within the search query element viewer display box, the alternative query elements each having a predetermined lexical or semantic relationship to the received portion of the initial query element, the alternative query elements obtained from a controlled vocabulary database comprising content that is related to at least a portion of a content of the information system, the relationship being dictated by one or more predetermined lexical and semantic criteria and wherein the alternative query elements are displayed in a manner that complies with at least one predefined preference.

37. A system for dynamic refinement of a search query of an information system, the system comprising:
    a search query receiver configured to receive a search query from a user entered by a user via a client computing device;
    a controlled vocabulary database which contains an indexed lexicon of elements of the information system;
    a query controller configured to handle communication between the search query receiver and the controlled vocabulary database;
    a search query submission control configured to allow the user to submit the search query for a full search of the information system; and
    a dynamic semantic list object configured to:
    automatically present a list of all search elements that are lexically-related alternatives to the search query each time the search query is modified but before the search query is submitted for a full search of the information system, the lexically-related alternatives contained on the controlled vocabulary database; and
    allow the user to replace the search query in the search query receiver with one or more of the lexically-related alternative elements; and
    a presentation control coupled to the dynamic semantic list object, configured to allow the user to set presentation attributes for arranging the presentation of the lexically-related alternative elements within the dynamic semantic list object.

38. The system as recited in claim 37, further comprising a network which facilitates communication between the search query receiver and the query controller.

39. The system as recited in claim 37, further comprising a network which facilitates communication between the query controller and the controlled vocabulary database.

40. The system as recited in claim 37, further comprising an administration module coupled to the controlled vocabulary database configured to allow an administrator to modify the elements within the controlled vocabulary database.

41. A method for identifying a query element suitable for use in search refinement and navigation in connection with an information system of interest, the method comprising the steps of:
    a) receiving an initial query element on a character-by-character basis;
    b) identifying one or more alternative query elements contained in a first database, the alternative query elements having a predetermined lexical relationship to the received portion of the initial query element;
    c) dynamically presenting the one or more alternative query elements to a user as the initial query element is received; and
    d) upon selection of an alternative query element by a user, performing one of the following steps:
    (i) navigating the information system in accordance with the selected alternative query element; and
    (ii) replacing the received portion of the initial query element with the selected alternative query element and repeating steps (b) through (c).

42. A method for identifying a query element for use in connection with an information system of interest, the method comprising the steps of:
    receiving a query element entered by a user at a client computing device;
    upon receipt of at least a portion of the query element, dynamically searching for a plurality of alternative query elements contained in a first computer-based database, the alternative query elements having a predetermined lexical relationship to at least one of a received portion of the query element and a lexicon of the information system of interest;
    dynamically presenting the plurality of alternative query elements to the user via a visual display operably connected to the client computing device, wherein the plurality of alternative query elements fall within two or more groupings, each grouping having associated therewith alternative query elements that have a different predetermined lexical relationship from that of another grouping and each grouping is presented so as to be visually associated with a given category;
    receiving an alternative query element selected by the user via an input device operably connected to the client computing device; and
    optionally navigating the information system in accordance with the selected alternative query element.

43. The method as recited in claim 42, wherein each of the given categories is visually presented so the respective alternative query elements of a given category are provided in a separate columnar display orientation from the alternate query elements of another given category.

44. The method as recited in claim 42, wherein the query element is textual and is entered by the user on a character-by-character basis and the step of dynamically searching is conducted for each character entered.

* * * * *